US009494929B2

(12) United States Patent
Haga et al.

(10) Patent No.: US 9,494,929 B2
(45) Date of Patent: Nov. 15, 2016

(54) NUMERICAL CONTROLLER HAVING PROGRAM RESTART FUNCTION

(71) Applicant: FANUC Corporation, Minamitsuru-gun, Yamanashi (JP)

(72) Inventors: Makoto Haga, Minamitsuru-gun (JP); Makoto Suzuki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 664 days.

(21) Appl. No.: 13/930,068

(22) Filed: Jun. 28, 2013

(65) Prior Publication Data

US 2014/0012408 A1    Jan. 9, 2014

(30) Foreign Application Priority Data

Jul. 5, 2012    (JP) ................. 2012-151307

(51) Int. Cl.
  *G05B 19/4067*    (2006.01)
  *G05B 19/042*    (2006.01)
  *G05B 19/18*    (2006.01)

(52) U.S. Cl.
  CPC ....... *G05B 19/4067* (2013.01); *G05B 19/0426* (2013.01); *G05B 19/18* (2013.01); *G05B 2219/34365* (2013.01); *G05B 2219/50098* (2013.01); *G05B 2219/50102* (2013.01); *G05B 2219/50104* (2013.01)

(58) Field of Classification Search
  CPC .......... G05B 19/0426; G05B 19/4067; G05B 19/4093; G05B 2219/34365; G05B 2219/50102; G05B 2219/50103; G05B 2219/50104
  See application file for complete search history.

(56) References Cited

U.S. PATENT DOCUMENTS

| 4,550,378 | A | * | 10/1985 | Nozawa | G05B 19/414 318/565 |
| 4,714,999 | A | * | 12/1987 | Kiya | G05B 19/4067 700/180 |
| 4,751,652 | A | * | 6/1988 | Kiya | G05B 19/4067 318/563 |
| 4,992,712 | A | * | 2/1991 | Fujimoto | G05B 19/186 318/569 |
| 5,293,024 | A | | 3/1994 | Sugahara et al. | |
| 6,862,492 | B2 | * | 3/2005 | Sagasaki | G05B 19/4067 318/565 |
| 7,574,267 | B2 | * | 8/2009 | Feuerbach | G05B 19/0426 700/1 |
| 7,966,092 | B2 | * | 6/2011 | Fujibayashi | G05B 19/4067 700/177 |
| 2008/0103625 | A1 | * | 5/2008 | Mochida | G05B 19/4067 700/174 |
| 2009/0055016 | A1 | | 2/2009 | Fujibayashi et al. | |
| 2011/0276173 | A1 | | 11/2011 | Otsuki et al. | |

FOREIGN PATENT DOCUMENTS

| CN | 101373379 A | 2/2009 |
| DE | 102011015296 A1 | 11/2011 |
| EP | 2104013 A2 | 9/2009 |
| JP | 09-160620 A | 6/1997 |
| JP | 2007-226648 A | 9/2007 |
| JP | 2009-053801 A | 3/2009 |

* cited by examiner

*Primary Examiner* — Crystal J Barnes-Bullock
(74) *Attorney, Agent, or Firm* — Drinker Biddle & Reath LLP

(57) ABSTRACT

The numerical controller has a program restart function and acquires program restart block data for resuming and ending suspended machining of a workpiece. The numerical controller analyzes a block of a machining program, and upon determining that a moving path of a tool, which is determined by the block, passes a boundary of a predetermined machining area of each controlled axis of a machine tool, the numerical controller acquires the program restart block data of that block and performs partial machining of the workpiece based on the acquired program restart block data.

13 Claims, 14 Drawing Sheets

FIG.1

|        | MINIMUM VALUE | MAXIMUM VALUE |
|--------|---------------|---------------|
| X AXIS | 5.0           | 10.0          |
| Y AXIS | 2.0           | 4.0           |
| Z AXIS | 4.0           | 7.0           |

FIG.2

|        | MINIMUM VALUE | MAXIMUM VALUE |
|--------|---------------|---------------|
| X AXIS | 5.0           | 10.0          |
| Y AXIS | 2.0           | 4.0           |
| Z AXIS | 4.0           | 4.0           |

FIG.3

|        | MINIMUM VALUE | MAXIMUM VALUE |
|--------|---------------|---------------|
| X AXIS | 5.0           | 10.0          |
| Y AXIS | 2.0           | 2.0           |
| Z AXIS | 4.0           | 4.0           |

FIG.4

|        | MINIMUM VALUE | MAXIMUM VALUE |
|--------|---------------|---------------|
| X AXIS | 5.0           | 5.0           |
| Y AXIS | 2.0           | 2.0           |
| Z AXIS | 4.0           | 4.0           |

|  | MINIMUM VALUE | MAXIMUM VALUE |
|---|---|---|
| X AXIS | 10.0 | 20.0 |
| Y AXIS | 5.0 | 15.0 |
| Z AXIS | -5.0 | 5.0 |

| RESTART INFORMATION LIST | | | | |
|---|---|---|---|---|
| NO. | PROG. NAME | SEQ. No. | BLOCK No. | ( PROGRAM ) |
| 001 | 00001 | 00000104 | 00000105 | N200T0202; |
| 002 | 00001 | 00000105 | 00000106 | N201M03S2000; |
| 003 | 00001 | 00000115 | 00000116 | N202G98F2000.0; |
| 004 | 00001 | 00000116 | 00000117 | N203G00G90X8.0Y12.0Z3.0; |
| 005 | 00001 | 00000204 | 00000205 | N204X13.0; |
| 006 | 00001 | 00000205 | 00000206 | N205M98P9000; |
| 007 | 09000 | 00000901 | 00000002 | N206G00G90X16.0; |
| 008 | 09000 | 00000908 | 00000009 | N207M98P9000; |
| 009 | 09000 | 00000909 | 00000010 | N208G00G90X23.0; |
| 010 | 00001 | 00000206 | 00000207 | N209M98P9000; |
| 011 | 00001 | 00000207 | 00000208 | N210G00G90X26.0; |
| 012 | 09000 | 00000901 | 00000002 | N211M98P9000; |
| 013 | 09000 | 00000908 | 00000009 | N212G00G90Z10.0; |
| 014 | 09000 | 00000909 | 00000010 | N213X0.0Y0.0; |
| 015 | 00001 | 00000208 | 00000209 | ... |

| RESTART EXEC (JUMP MODE) | RESTART EXEC (SIMU. MODE) | | | | |
|---|---|---|---|---|---|

FIG.16

```
RESTART INFORMATION LIST
 NO.  PROG. NAME  SEQ.No.    BLOCK No.    ( PROGRAM )
 001  00001        00000103   00000104    N200T0202;
 002  00001        00000104   00000105    N201M03S2000;
 003  00001        00000105   00000106    N202G98F2000.0;
 004  00001        00000115   00000116    N203G00G90X8.0Y12.0Z3.0;
 005  00001        00000116   00000117    N204X13.0;
 006  00001        00000117   00000118    N205M98P9000;
 007  00001        00000203   00000204    N206G00G90X16.0;
 008  00001        00000204   00000205    N207M98P9000;
 009  00001        00000205   00000206    N208G00G90X23.0;
 010  09000        00000909   00000010    N209M98P9000;
 011  00001        00000208   00000209    N210G00G90X26.0;
 012  00001        00000209   00000210    N211M98P9000;
                                          N212G00G90Z10.0;
                                          N213X0.0Y0.0;
                                          ...
RESTART EXEC | RESTART EXEC
(JUMP MODE)  | (SIMU. MODE)
```

FIG.17

```
RESTART INFORMATION LIST
 NO.  PROG. NAME  SEQ.No.    BLOCK No.    ( PROGRAM )
 001  00001        00000104   00000105    N200T0202;
 002  00001        00000105   00000106    N201M03S2000;
 003  00001        00000115   00000116    N202G98F2000.0;
 004  00001        00000116   00000117    N203G00G90X8.0Y12.0Z3.0;
 005  00001        00000204   00000205    N204X13.0;
 006  00001        00000205   00000206    N205M98P9000;
 007  09000        00000901   00000002    N206G00G90X16.0;
 008  09000        00000908   00000009    N207M98P9000;
 009  09000        00000909   00000010    N208G00G90X23.0;
 010  00001        00000206   00000207    N209M98P9000;
 011  00001        00000207   00000208    N210G00G90X26.0;
 012  09000        00000901   00000002    N211M98P9000;
 013  09000        00000908   00000009    N212G00G90Z10.0;
 014  09000        00000909   00000010    N213X0.0Y0.0;
 015  00001        00000208   00000209    ...
RESTART EXEC | RESTART EXEC
(JUMP MODE)  | (SIMU. MODE)
```

FIG.18

```
RESTART INFORMATION LIST

NO.   PROG. NAME  SEQ. No.   BLOCK No.      ( PROGRAM )
   001   00001       00000104   00000105       N200T0202;
   002   00001       00000105   00000106       N201M03S2000;
   003   00001       00000115   00000116       N202G98F2000.0;
   004   00001       00000116   00000117     S N203G00G90X8.0Y12.0Z3.0;
 S 005   00001       00000204   00000205       N204X13.0;
   006   00001       00000205   00000206       N205M98P9000;
   007   09000       00000901   00000002       N206G00G90X16.0;
   008   09000       00000908   00000009       N207M98P9000;
   009   09000       00000909   00000010       N208G00G90X23.0;
   010   00001       00000206   00000207       N209M98P9000;
   011   00001       00000207   00000208       N210G00G90X26.0;
   012   09000       00000901   00000002       N211M98P9000;
   013   09000       00000908   00000009       N212G00G90Z10.0;
   014   09000       00000909   00000010       N213X0.0Y0.0;
   015   00001       00000208   00000209       ...

RESTART EXEC  | RESTART EXEC
 (JUMP MODE)   | (SIMU. MODE)
```

FIG.19

```
RESTART INFORMATION LIST

NO.   PROG. NAME  SEQ. No.   BLOCK No.      ( PROGRAM )
   001   00001       00000104   00000105       O9000
   002   00001       00000105   00000106       N901G00G91Z-2.5;
   003   00001       00000115   00000116       N902G01Z-3.5;
   004   00001       00000116   00000117       N903Y1.0;
 S 005   00001       00000204   00000205       N904G03X1.0Y-1.0R1.0;
   006   00001       00000205   00000206       N905G01Y-1.0;
   007   09000       00000901   00000002       N906G02X-1.0Y1.0R1.0;
   008   09000       00000908   00000009       N907G01W3.5;
   009   09000       00000909   00000010     E N908G00W2.5;
   010   00001       00000206   00000207       N909M99;
   011   00001       00000207   00000208
   012   09000       00000901   00000002
 E 013   09000       00000908   00000009
   014   09000       00000909   00000010
   015   00001       00000208   00000209

RESTART EXEC  | RESTART EXEC
 (JUMP MODE)   | (SIMU. MODE)
```

NUMERICAL CONTROLLER HAVING PROGRAM RESTART FUNCTION

RELATED APPLICATION DATA

This application claims priority under 35 U.S.C. §119 and/or §365 to Japanese Application No. 2012-151307 filed Jul. 5, 2012, the entire contents is incorporated herein by reference.

BACKGROUND OF THE INVENTION

1. Field of the Invention

The present invention relates to a numerical controller that controls machine tools, and more particularly to a numerical controller having a program restart function.

2. Description of the Related Art

A program restart function of acquiring data of a non-cutting command block as program restart block data for resuming a suspended machining process of a workpiece is disclosed, for example, in Japanese Patent Application Laid-open No. 2009-53801.

This program restart block data contains information required for resuming the program such as a number of a block of the currently executed machining program, start and end positions of the currently executed block, various pieces of modal information of the currently executed block, a number of a main program and a subprogram call block position, and a total number of blocks from the main program to the currently executed block.

Non-cutting commands include, aside from a program restart block data acquisition code pre-registered as a non-cutting command for acquisition of the program restart block data, rapid traverse commands, auxiliary function commands, commands for moving a pre-registered controlled axis, tool position correction commands, dwell commands, spindle stop commands, spindle rotation commands, and subprogram call commands.

However, to decide in which portion of the machining object the machining needs to be resumed from the drawing, it takes a large number of steps to determine through examination which of the non-cutting command blocks is the command desired to be executed, and this can be a factor for occurrence of human errors.

Japanese Patent Application Laid-open No. 9-160620 discloses an example of a solution to this problem. According to the disclosure, command data is stored, a machining area is selected, and the command data is examined with respect to the machining area. If the command data involves commands to be executed within the machining area, the commands of this command data are executed. If the command data involves commands executed outside the machining area, the commands of this command data are not executed. Next, it is determined whether or not an axial movement instructed by the command data is a movement from outside into the machining area, and if the axial movement is determined to be as such, an intersection between the axial movement path and a boundary of the machining area, or a point in the vicinity, is determined, and this intersection or point is set as the start point for resuming the program.

With this method, however, there is no means of verifying programs neighboring the start block before resuming the program, because of which there is a risk that the operator may execute the program from a different block from the intended one. Moreover, since no block is set as the end block of the resumed program, if the machining program involves a series of processes using a plurality of machine tools and is repeated over and over in the specified machining area, there is a risk that the machining may be executed beyond an intended area of the machining program.

Another solution is shown in Japanese Patent Application Laid-open No. 2007-226648, wherein an execution start position for starting execution of a machining program and an execution end position for ending the execution are stored, and the program is executed only from the command corresponding to the execution start position to the command corresponding to the execution end position.

With this method, however, an execution start position and an execution end position are uniquely defined, i.e., the execution start position or the execution end position cannot be freely selected from a plurality of blocks instructing a tool to move in a path that intersects with a boundary of a given machining area, or their neighboring blocks.

SUMMARY OF THE INVENTION

Accordingly, an object of the present invention is to provide a numerical controller having a program restart function, with which command blocks of a specified machining area of a machining object are readily examined as required to be set as a start block and an end block for resuming a program, so that the machining program can be partially executed again.

A numerical controller according to the present invention controls a machine tool having a plurality of controlled axes by analyzing and executing blocks of a machining program to machine a workpiece, and has a program restart function in which program restart block data is acquired for resuming and ending suspended machining of the workpiece, and partial machining of the workpiece is performed based on the acquired program restart block data.

In a first embodiment, the numerical controller includes: a specified area registration unit that specifies a machining area of each of the controlled axes and registering the specified machining area; a specified area passing block determination unit that analyzes a block of the machining program and determines whether or not a moving path of a tool as commanded by the block, obtained by the analyzing the block, passes a boundary of the machining area registered in the specified area registration unit; and a program restart block data acquisition unit that acquires the program restart block data of a block of the machining program if determined by the specified area passing block determination unit that the moving path of a tool as commanded by the block passes a boundary of the machining area registered in the specified area registration unit.

The specified area passing block determination unit may determine whether or not a sequence of the distal end points of the tool, which is obtained by correcting the moving path of the tool to the positions of the tool distal end points, passes the boundary of the machining area.

The program restart block data acquisition unit may acquire, in addition to the program restart block data of a block of the machining program, the program restart block data of immediately preceding and succeeding blocks of the block, if determined by the specified area passing block determination unit that the moving path of a tool as commanded by the block passes a boundary of the registered machining area.

The numerical controller may further include: a list display unit displaying a list of a plurality of program restart block data sets acquired by the program restart block data acquisition unit; a program restart block data selecting unit selecting one of the program restart block data sets displayed in the list; a machining program display unit displaying a machining program neighboring the selected program restart block data set; and a setting unit setting the selected program restart block data set or a block of the neighboring machining program as a start block and an end block of a program resumed by the program restart function.

In a second embodiment, the numerical controller includes: a specified area registration that specifies a machining area of each of the controlled axes and registering the specified machining area; a determination unit that determines whether or not a block of the machining program is a non-cutting block; a non-cutting block in-or-out determination unit that analyzes a non-cutting block of the machining program, if the non-cutting block involves a motion, to determine whether or not a moving path of a tool as commanded by this block is inside the machining area registered in the specified area registration unit, and that determines, on the other hand, whether or not a tool position during execution of that non-cutting block is located inside the machining area registered in the specified area registration unit if the non-cutting block of the machining program does not involve a motion; and a program restart block data acquisition unit that acquires the program restart block data of the non-cutting block in which a tool path or tool position has been determined to be located inside the machining area by the non-cutting block in-or-out determination unit and extracted.

The non-cutting block may include at least one of a program restart block data acquisition code pre-registered as a non-cutting command for acquisition of the program restart block data, a rapid traverse command, an auxiliary function command, a command for moving a pre-registered controlled axis, a tool position correction command, a dwell command, a spindle stop command, a spindle rotation command, and a subprogram call command.

The non-cutting block in-or-out determination unit may determine whether or not a sequence of the distal end points of the tool, which is obtained by correcting the moving path of the tool to the positions of the distal end points of the tool, passes the boundary of the machining area, or determines whether a position of a distal end point of the tool, which is obtained by correcting the tool position to the position of the distal end point of the tool, is located inside the machining area.

The numerical controller may further include: a list display unit displaying a list of a plurality of program restart block data sets acquired by the program restart block data acquisition unit; a program restart block data selecting unit selecting one of the program restart block data sets displayed in a list; a machining program display unit displaying a machining program neighboring the selected program restart block data set; and a setting unit setting the selected program restart block data set or a block of the neighboring machining program as a start block and an end block of a program resumed by the program restart function.

In a third embodiment, the numerical controller includes: a specified area registration that specifies a machining area of each of the controlled axes and registering the specified machining area; a determination unit that determines whether or not a block of the machining program is a non-cutting block; a non-cutting block out-or-in determination unit that analyzes a non-cutting block of the machining program, if the non-cutting block involves a motion, to determine whether or not a moving path of a tool as commanded by this block is outside the machining area registered in the specified area registration unit, and that determines, on the other hand, whether or not a tool position during execution of that non-cutting block is located outside the machining area registered in the specified area registration unit if the non-cutting block of the machining program does not involve a motion; and a program restart block data acquisition unit that acquires the program restart block data of the non-cutting block in which a tool path or tool position has been determined to be located outside the machining area by the non-cutting block out-or-in determination unit and extracted.

The non-cutting block may include at least one of a program restart block data acquisition code pre-registered as a non-cutting command for acquisition of the program restart block data, a rapid traverse command, an auxiliary function command, a command for moving a pre-registered controlled axis, a tool position correction command, a dwell command, a spindle stop command, a spindle rotation command, and a subprogram call command.

The non-cutting block out-or-in determination unit may include the non-cutting block out-or-in determination unit may determine whether or not a sequence of the distal end points of the tool, which is obtained by correcting the moving path of the tool to the positions of the distal end points of the tool, passes the boundary of the machining area, or determines whether a position of a distal end point of the tool, which is obtained by correcting the tool position to the position of the distal end point of the tool, is located outside the machining area.

The numerical controller may further include: a list display unit displaying a list of a plurality of program restart block data sets acquired by the program restart block data acquisition unit; a program restart block data selecting unit selecting one of the program restart block data sets displayed in a list; a machining program display unit displaying a machining program neighboring the selected program restart block data set; and a setting unit setting the selected program restart block data set or a block of the neighboring machining program as a start block and an end block of a program resumed by the program restart function.

The program restart block data may be data required for resuming the program, and includes at least one of a block number of a currently executed machining program, start and end positions of the currently executed block, various pieces of modal information of a currently executed block, a number of a main program and a subprogram call block position, and a total number of blocks from the main program to the currently executed block.

According to the present invention, command blocks of a specified machining area of the machining object are readily examined as required to be set as a start block and an end block for resuming a program, so that the machining program can be partially executed again, whereby the occurrence of human errors and the number of steps can be reduced. When resuming the machining, the programs neighboring the start block and end block can also be verified, so that the risk of inadvertently executing the machining to an area different from the intended area of the program can be reduced.

BRIEF DESCRIPTION OF THE DRAWINGS

The above and other objects and features of the present invention will become apparent from the following descriptions of embodiments with reference to the accompanying drawings, in which:

FIG. 1 is a diagram explaining a case in which different values are set as the minimum and maximum values (minimum≠maximum) for movement along each of the three axes (X-axis, Y-axis, and Z-axis) of a machine tool controlled by a numerical controller;

FIG. 2 is a diagram explaining a case in which the same value is set as the minimum and maximum values (minimum=maximum) for movement along one axis (Z-axis) of the machine tool;

FIG. 3 is a diagram explaining a case in which the same value is set as the minimum and maximum values (minimum=maximum) for movement along two axes (Y-axis and Z-axis) of the machine tool;

FIG. 4 is a diagram explaining a case in which the same value is set as the minimum and maximum values for movement along all the three axes of the machine tool;

FIG. 11 is a diagram explaining an example of a machining program;

FIG. 16 shows a second example of a program restart block list screen;

FIG. 17 shows a third example of a program restart block list screen;

FIG. 18 shows a fourth example of a program restart block list screen;

FIG. 19 shows a fifth example of a program restart block list screen;

DESCRIPTION OF THE PREFERRED EMBODIMENTS

Figure 5:
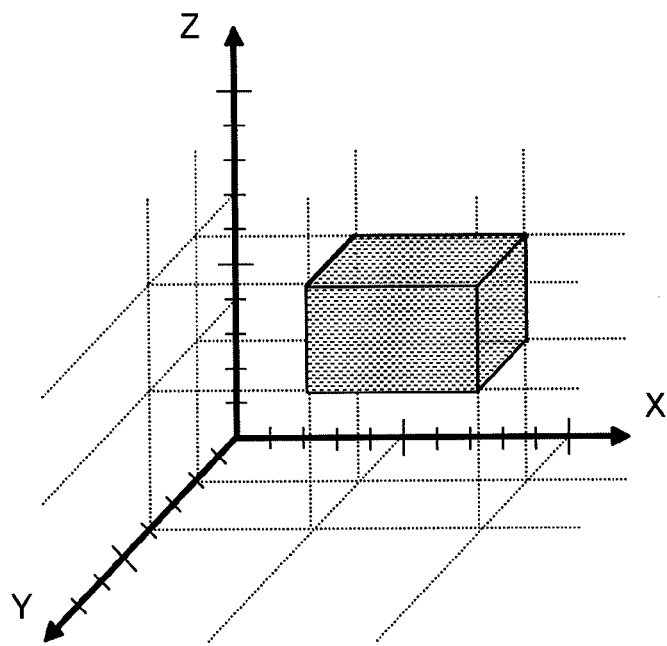
FIG. 5 is a diagram illustrating an area (space) when the respective minimum and maximum values for movement along the three axes (X-axis, Y-axis, and Z-axis) of the machine tool are set as shown in FIG. 1.

In the present invention, block data of a block commanding a motion of a tool to intersect with a boundary of a plane or space registered as a machining area by specifying areas of a plurality of controlled axes, or its neighboring block, is acquired as program restart block data for resuming and ending a machining process of a workpiece.

If the machining area is specified as a space, block data of non-cutting blocks performed inside or outside the machining area is also acquired.

Partial machining of the workpiece can be performed based on the thus acquired program restart block data. The block data can be selected from a list of a plurality of thus acquired program restart block data sets, and neighboring blocks can also be selected as a start block and an end block for the resumed program.

The numerical controller according to the present invention controls a machine tool having a plurality of controlled axes to machine a workpiece, by analyzing and executing blocks of a machining program. This numerical controller includes a program restart function for resuming suspended machining of the workpiece, wherein block data is acquired for resuming and ending the suspended machining as program restart block data and partial machining of the workpiece is performed based on the acquired program restart block data. Some embodiments of this numerical controller having a program restart function will be described below.

Embodiment 1

The numerical controller having a program restart function according to Embodiment 1 includes a specified area registration unit, a specified area passing block determination unit, and a program restart block data acquisition unit. The specified area registration unit specifies a machining area of each of the controlled axes of a machine tool. The specified area passing block determination unit analyzes a block of a machining program and determines whether or not a moving path of a tool, which is determined by the analysis of the block, passes a boundary of a machining area registered in the specified area registration unit. If the specified area passing block determination unit determines that the block of the machining program is a block commanding a motion passing the boundary of the registered machining area, then the program restart block data acquisition unit acquires the program restart block data of that block.

These specified area registration unit, specified area passing block determination unit, and program restart block data acquisition unit will each be described below.

Specified Area Registration Unit

The specified area registration unit decides in which portion of the machining object the machining needs to be resumed, based on a drawing or the like of the object. In a numerical controller described with reference to FIG. 23, data for specifying an area is input to the numerical controller by means of input means such as a monitor/manual input unit 20, and stored in a memory.

FIG. 1 is a diagram explaining a case in which different values are set as the minimum and maximum values (minimum≠maximum) for movement along each of the three axes (X-axis, Y-axis, and Z-axis) of a machine tool controlled by the numerical controller. FIG. 2 is a diagram explaining a case in which the same value is set as the minimum and maximum values (minimum=maximum) for movement along one axis (Z-axis) of the machine tool. FIG. 3 is a diagram explaining a case in which the same value is set as the minimum and maximum values for movement along two axes (Y-axis and Z-axis) of the machine tool. FIG. 4 is a diagram explaining a case in which the same value is set as the minimum and maximum values for movement along all the three axes of the machine tool.

How an area is specified will be described below using a three-dimensional space formed by X, Y, and Z coordinates. Minimum and maximum values are set for each of the X-axis, Y-axis, and Z-axis to specify a planar or spatial machining area.

If the minimum and maximum values are different for all of the three, X, Y, and Z, axes as in the example of FIG. 1, the specified area will be a "space" as shown in FIG. 5.

Figure 6:
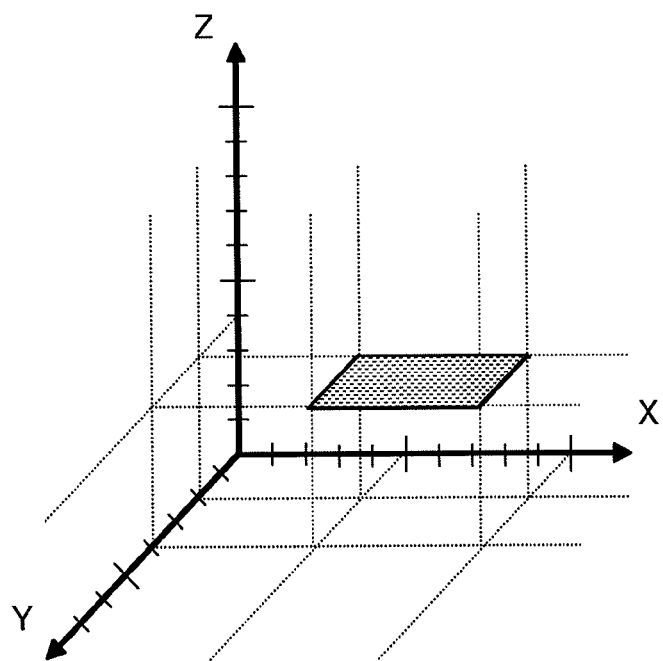
FIG. 6 is a diagram illustrating an area (surface) when the respective minimum and maximum values for movement along the three axes (X-axis, Y-axis, and Z-axis) of the machine tool are set as shown in FIG. 2.

If the minimum and maximum values are different for two of the three, X, Y, and Z, axes (e.g., X-axis and Y-axis) while the minimum and maximum values are the same for the remaining one axis as in the example of FIG. 2, the specified area will be a "surface" as shown in FIG. 6.

If the minimum and maximum values are different for one of the three, X, Y, and Z, axes (e.g., X-axis) while the minimum and maximum values are the same for the remaining two axes as in the example of FIG. 3, the specified area will be a "line".

If the minimum and maximum values are the same for all of the three, X, Y, and Z, axes as in the example of FIG. 4, the specified area will be a "point".

Note that, using other axes than the X-axis, Y-axis and Z-axis (which are three basic axes controlled by the numerical controller), an area can also be specified and registered.

Specified Area Passing Block Determination Unit

Figure 7:
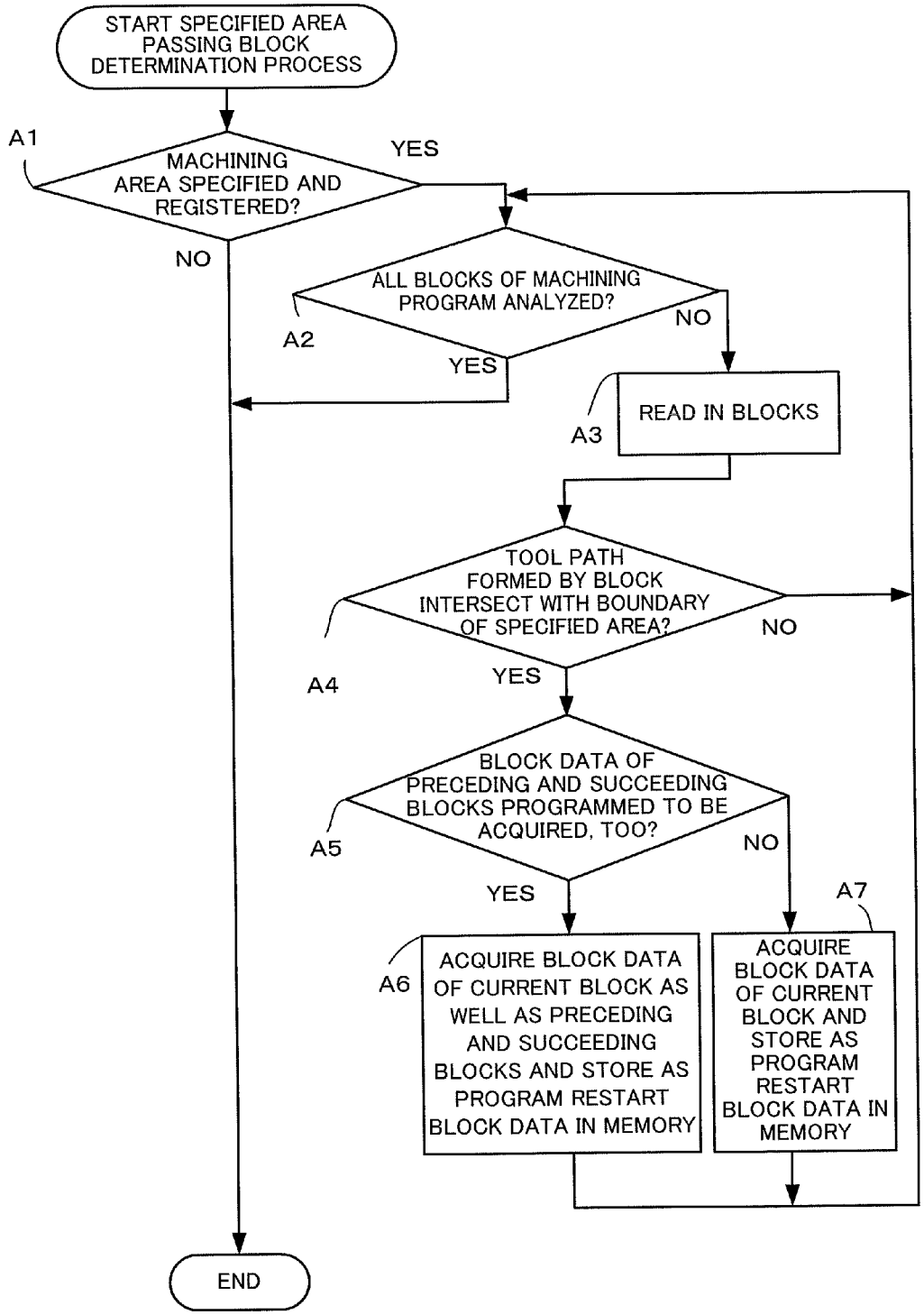
FIG. 7 is a flowchart explaining a process executed by a specified area passing block determination unit.

The specified area passing block determination unit analyzes blocks of a machining program and determines whether or not the moving path of a tool, which is obtained as a result of the analysis, has an intersection with a boundary of a machining area registered in the specified area registration unit. The process executed by this specified area passing block determination unit will be explained with reference to the flowchart of FIG. 7.

First, it is determined whether or not a machining area has been specified, using coordinates, by the specified area registration unit (A1). If no machining area has been specified (NO at decision A1), the process ends here, while, if there has been specified a machining area (YES at decision A1), it is determined whether or not all the blocks of the machining program have been analyzed (A2). If all the blocks have been analyzed (YES at decision A2), the process ends here. If there are still some blocks left to be analyzed (NO at decision A2), the blocks of the machining program are read in (A3).

It is then determined whether or not a moving path of a tool that is formed by one of the blocks read in at step A3 (currently analyzed block) has an intersection with a boundary of the machining area registered in the specified area registration unit (A4). If there is no intersection (NO at decision A4), the process goes back to the decision step A2. If there is an intersection (YES at decision A4), it is determined whether or not the program restart data of the preceding and succeeding blocks of the currently analyzed block is programmed to be acquired together (A5). A 'moving path of a tool', used in the decision step A4, may be a sequence of the distal end points of the tool, which is obtained by correcting the moving path of the tool by taking into consideration the length of the tool and a rotation axis.

If the program restart data of the preceding and succeeding blocks of the currently analyzed block is programmed to be acquired together (YES at decision A5), data of the currently analyzed block and of the immediately preceding and succeeding blocks is acquired collectively as "program restart block data" and stored in the memory (A6), and the process goes back to the decision step A2. If the program restart data of the preceding and succeeding blocks of the currently analyzed block is not programmed to be acquired together (NO at decision A5), data of the currently analyzed block is acquired as the "program restart block data" and stored in the memory (A7), and the process goes back to the decision step A2.

This "program restart block data" is data required for resuming the program, and includes a block number of the currently executed machining program, start and end positions of the currently executed block, various pieces of modal information of the currently executed block, a number of a main program and a subprogram call block position, a total number of blocks from the main program to the currently executed block, and the like.

Program Restart Block Data Acquisition Unit

The program restart block data acquisition unit can acquire program restart block data by either of the following two methods (Method 1 and Method 2).

Method 1

If an area is already specified and registered before a machining program is executed (that is, if data that specifies an area is already set and stored in the memory of the numerical controller), the program restart block data is acquired during the execution of the machining program.

Method 2

In case where the specified area is registered after an interruption of the machining and then "search" operation is performed, the program is run without moving the axes so that the program restart block data is acquired by the modal information of codes such as G codes, M codes, S codes, T codes and B codes which are instructed by the machining program and "provisional execution mode" in which the internal coordinates of the numerical controller (CNC) is updated at high speed.

Embodiment 2

The numerical controller having a program restart function according to Embodiment 2 includes a specified area registration unit, a determination unit, a non-cutting block in-or-out determination unit, and a program restart block data acquisition unit. The specified area registration unit specifies a machining area of each of the controlled axes of a machine tool. The determination unit determines whether or not a block of a machining program is a non-cutting block. If the block of the machining program is a non-cutting block that involves a motion, then the non-cutting block in-or-out determination unit analyzes this non-cutting block to determine whether or not a moving path of a tool as commanded by this block is inside the registered machining area, while, if the block of the machining program is a non-cutting block that does not involve a motion, the non-cutting block in-or-out determination unit determines whether or not the tool position during execution of that non-cutting block is located inside the registered machining area. The program restart block data acquisition unit acquires the program restart block data of the non-cutting block in which a tool path or tool position has been determined to be located inside the machining area by the non-cutting block in-or-out determination unit and extracted.

Figure 8:
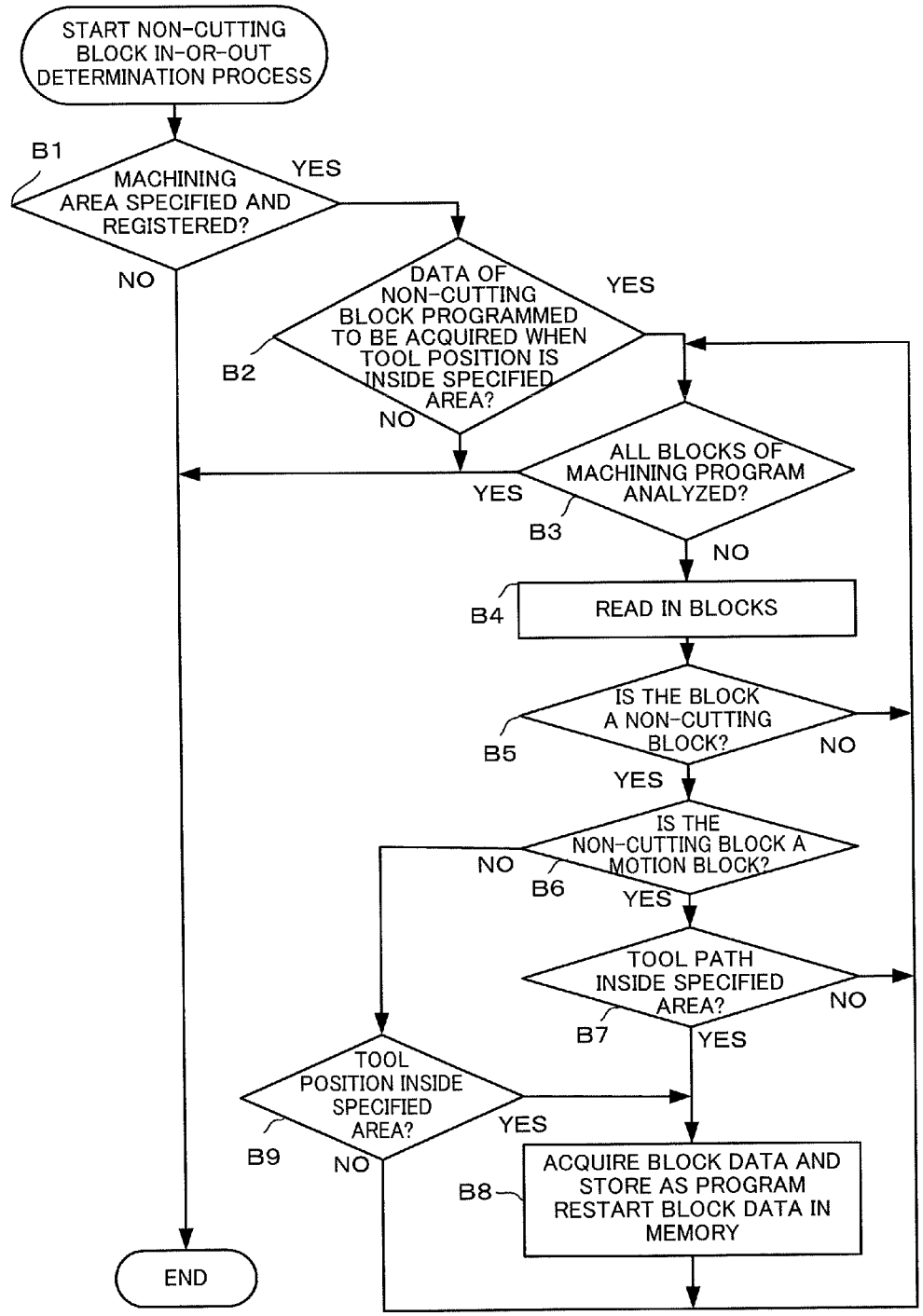
FIG. 8 is a flowchart explaining a process executed by a non-cutting block in-or-out determination unit.

Non-Cutting Block In-or-Out Determination Unit (a) If a non-cutting block is a block that involves a motion, the non-cutting block in-or-out determination unit analyzes this non-cutting block to determine whether or not a moving path of a tool, which is obtained as a result of the analysis (hereinafter, tool path), is inside the machining area registered in the specified area registration unit, while (b) if the non-cutting block is a block that does not involve a motion, the non-cutting block in-or-out determination unit determines whether or not the position of the tool during execution of that non-cutting block (hereinafter, tool position) is located inside the machining area registered in the specified area registration unit. The process executed by this non-cutting block in-or-out determination unit will be explained with reference to the flowchart of FIG. 8.

First, it is determined whether or not a machining area has been specified by coordinates in the specified area registration unit (B1). If no machining area has been specified (NO at decision B1), the process ends here, while, if there has been specified a machining area (YES at decision B1), it is determined further whether or not block data of a non-cutting block is programmed to be acquired as the program restart block data if the tool position is located inside the specified area (B2). If the block data of a non-cutting block is not programmed to be acquired in such a case (NO at decision B2), the process ends here. If the block data of a non-cutting block is programmed to be acquired in such a case (YES at decision B2), it is determined whether or not all the blocks registered in the machining program have been analyzed (B3). If all the blocks have been analyzed (YES at decision B3), the process ends here. If there are still some blocks left to be analyzed (NO at decision B3), the blocks of the machining program are read in (B4).

It is then determined whether or not a block read in by the execution of the step B4 (currently analyzed block) is a non-cutting block (B5). If it is not a non-cutting block (NO at decision B5), the decision step B3 is performed again, while if it is a non-cutting block (YES at decision B5), it is determined next whether or not this non-cutting block is a block containing a command that involves a motion (B6).

If it is determined to be a block containing a command that involves a motion (YES at decision B6), it is determined next whether or not the tool path is inside the specified area (B7). If the tool path is not inside the specified area (NO at decision B7), the decision step B3 is performed again. On the other hand, if the tool path is determined to be inside the specified area, block data of that block is acquired as the program restart block data and stored in the memory (B8), after which the process returns again to the decision step B3.

If it is determined not to be a block containing a command that involves a motion (NO at decision B6), it is determined whether or not the tool position is located inside the specified area (B9). If the tool position is not inside the specified area (NO at decision B9), the process returns to the decision step B3, while, if the tool position is determined to be inside the specified area (YES at decision B9), the program restart block data of that block is acquired and stored in the memory (B8), after which the process returns again to the decision step B3.

Embodiment 3

The numerical controller having a program restart function according to Embodiment 3 includes a specified area registration unit, a determination unit, a non-cutting block out-or-in determination unit, and a program restart block data acquisition unit. The specified area registration unit specifies a machining area of each of the controlled axes of a machine tool. The determination unit determines whether or not a block of a machining program is a non-cutting block. If the block of the machining program is a non-cutting block that involves a motion, then the non-cutting block out-or-in determination unit analyzes this non-cutting block to determine whether or not a moving path of a tool as commanded by this block is outside the registered machining area, while, if the block of the machining program is a non-cutting block that does not involve a motion, the non-cutting block out-or-in determination unit determines whether or not the tool position during execution of that non-cutting block is located outside the registered machining area. The program restart block data acquisition unit acquires the program restart block data of the non-cutting block in which a tool path or tool position has been determined to be located outside the machining area by the non-cutting block out-or-in determination unit and extracted.

Figure 9:
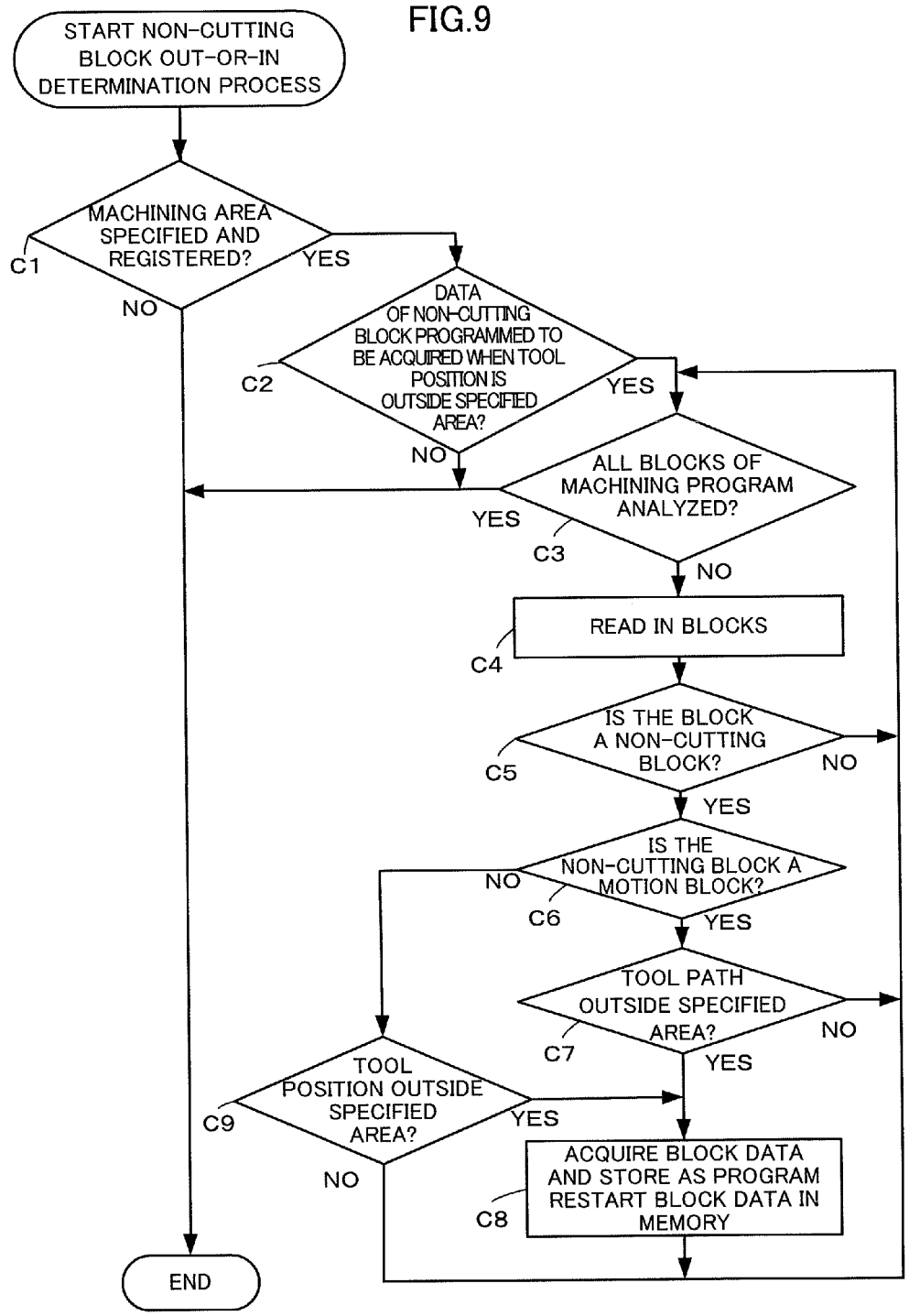
FIG. 9 is a flowchart explaining a process executed by a non-cutting block out-or-in determination unit.

Non-Cutting Block Out-or-In Determination Unit (a) If a non-cutting block is a block that involves a motion, the non-cutting block out-or-in determination unit analyzes this non-cutting block to determine whether or not a moving path of a tool, which is obtained as a result of the analysis (hereinafter, tool path), is outside the machining area registered in the specified area registration unit, while (b) if the non-cutting block is a block that does not involve a motion, the non-cutting block out-or-in determination unit determines whether or not the position of the tool during execution of that non-cutting block (hereinafter, tool position) is located outside the machining area registered in the specified area registration unit. The process executed by this non-cutting block out-or-in determination unit will be explained with reference to the flowchart of FIG. 9.

First, it is determined whether or not a machining area has been specified by the specified area registration unit (C1). If no machining area has been specified (NO at decision C1), the process ends here, while, if there has been specified a machining area (YES at decision C1), it is determined further whether or not block data of a non-cutting block is programmed to be acquired as the program restart block data if the tool position is located outside the specified area (C2). If the block data of a non-cutting block is not programmed to be acquired in such a case (NO at decision C2), the process ends here. If the block data of a non-cutting block is programmed to be acquired in such a case (YES at decision C2), it is determined whether or not all the blocks registered in the machining program have been analyzed (C3).

If all the blocks have been analyzed (YES at decision C3), the process ends here. If there are still some blocks left to be analyzed (NO at decision C3), the blocks of the machining program are read in (C4).

It is then determined whether or not a block read in by the execution of the step C4 (currently analyzed block) is a non-cutting block (C5). If it is not a non-cutting block (NO at decision C5), the decision step C3 is performed again, while if it is a non-cutting block (YES at decision C5), it is determined next whether or not this non-cutting block is a block containing a command that involves a motion (C6).

If it is determined to be a block containing a command that involves a motion (YES at decision C6), it is determined next whether or not the tool path is outside the specified area (C7). If the tool path is not outside the specified area (NO at decision C7), the process returns again to the decision step C3. On the other hand, if the tool path is determined to be outside the specified area, the program restart block data of that block is acquired and stored in the memory (C8), after which the process returns again to the decision step C3.

If it is determined not to be a block containing a command that involves a motion (NO at decision C6), it is determined whether or not the tool position is located outside the specified area (C9). If the tool position is not outside the specified area (NO at decision C9), the process returns to the decision step C3, while, if the tool position is determined to be outside the specified area (YES at decision C9), the program restart block data of that block is acquired and stored in the memory (C8), after which the process returns again to the decision step C3.

The decision at C7 to "determine whether or not the tool path is outside the specified area" and the decision at C9 to "determine whether or not the tool position is outside the specified area" can be replaced by decision to "determine whether or not the tool path is adjacent outside the specified area" and decision to "determine whether or not the tool position is adjacent outside the specified area", respectively. Here, the tool path or tool position being "adjacent outside the specified area" means that the tool path or position is within a range of a specified number of blocks from a neighboring block of the currently analyzed block (block read in by the execution of the step C4), or within a certain adjacent area specified by coordinates.

The program restart block data acquisition unit will now be described with reference to FIG. 10 to FIG. 19.

Figures 10, 12, 13:
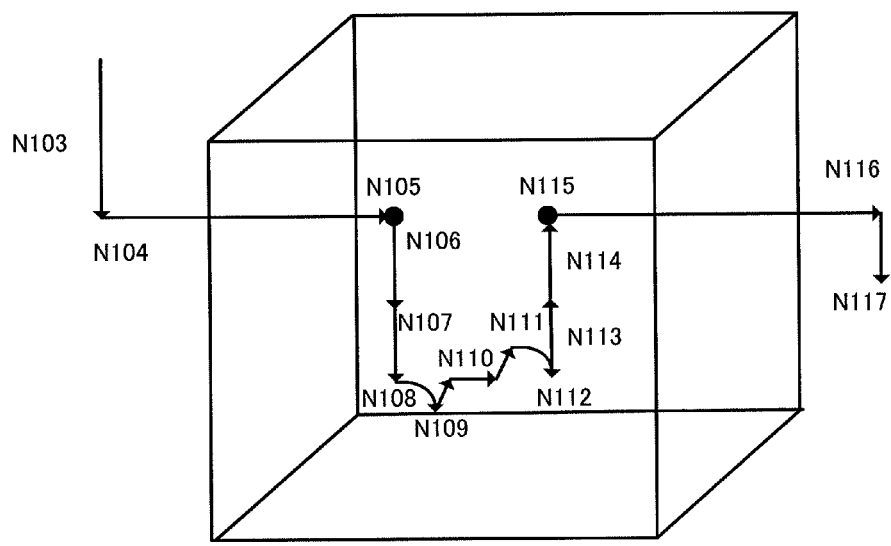
FIG. 10 is a diagram showing an example of selecting an area where machining is to be resumed.
FIG. 12 is a diagram showing an example of a subprogram executed during execution of the machining program shown in FIG. 11.
FIG. 13 is a diagram showing the movement of a tool in respective blocks when the machining program shown in FIG. 11 (N100 to N118) is executed.
Figure 11:
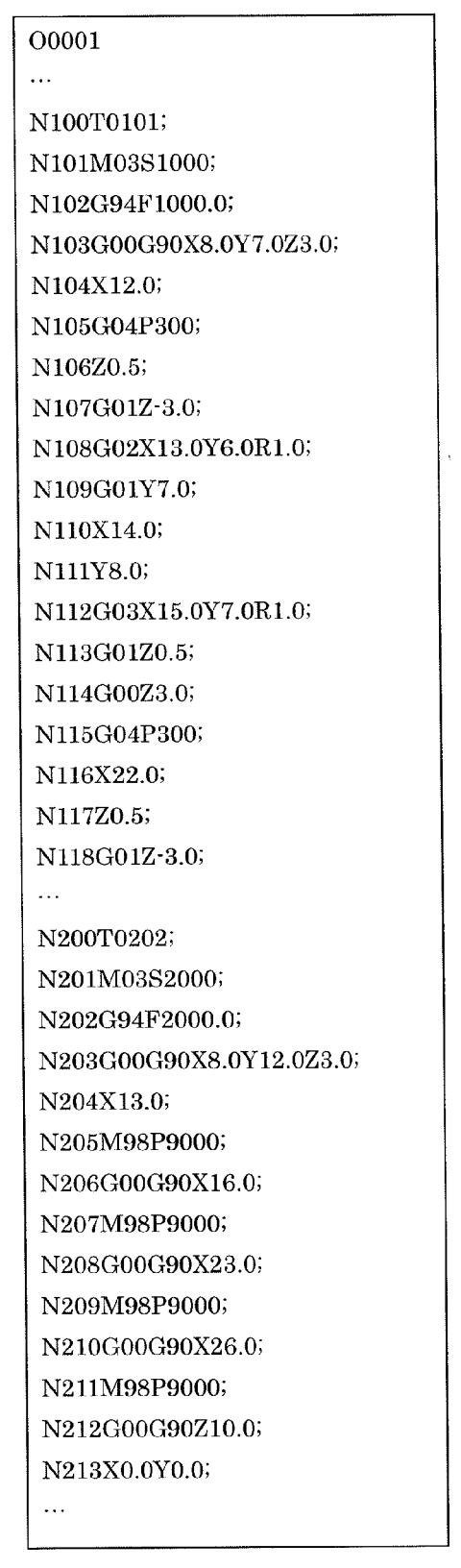

The numerical controller is configured such that, when an area of a machining object where the machining is to be resumed is specified and registered as shown in FIG. 10, and when the numerical controller analyzes the machining program shown in FIG. 11 and the subprogram shown in FIG. 12 performed during the execution of the machining program, the numerical controller acquires the program restart block data of blocks of which tool paths pass a boundary of this registered specified area and non-cutting blocks executed within this specified area. This program restart block data to be acquired will be described below.

Figures 14, 15:
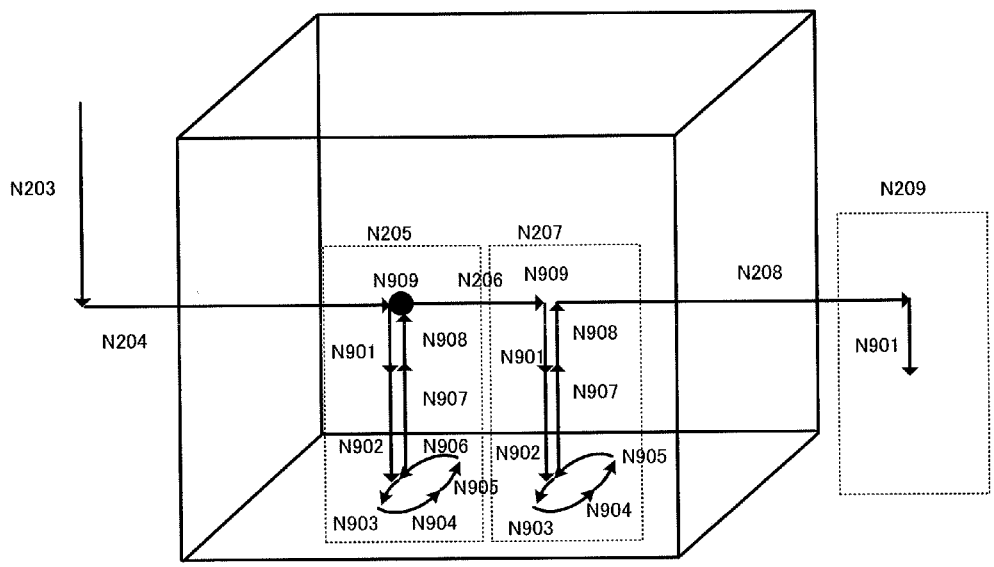
FIG. 14 is a diagram showing the movement of a tool in respective blocks when the machining program shown in FIG. 11 (N200 to N213) is executed.
FIG. 15 shows a first example of a program restart block list screen.

How the blocks within the specified area are executed will be explained with reference to FIG. 13 and FIG. 14. FIG. 13 is a diagram showing the movement of a tool in respective blocks when the machining program shown in FIG. 11 (N100 to N118) is executed. FIG. 14 is a diagram showing the movement of a tool in respective blocks when the machining program shown in FIG. 11 (N200 to N213) is executed.

As shown in FIG. 13, if blocks N100 to N118 are to be executed, blocks N104 to N116 will be executed on the boundaries of the specified area or inside the specified area. As shown in FIG. 14, if blocks N200 to N213 are to be executed, blocks N204 to N208 will be executed within the boundaries of the specified area, or inside the specified area. Therefore block data of the blocks N104, N116, N204, and N208 of which tool paths pass a boundary of the specified area is acquired as the program restart block data.

Further, referring to FIG. 15, blocks N105, N115, N205, N901/N908/N909 executed by N205, N206, N207, and N901/N908/N909 executed by N207, are acquired as non-cutting blocks to be executed within the specified area.

The "non-cutting block in-or-out determination unit" in Embodiment 2, the "non-cutting block out-or-in determination unit" in Embodiment 3, and the "program restart block data acquisition unit" in Embodiments 2 and 3 will be described.

The numerical controller is configured such that, when an area where the machining is to be resumed is specified and registered as shown in FIG. 10, and when the numerical controller analyzes the machining program shown in FIG. 11 and the subprogram shown in FIG. 12 performed during the execution of the machining program, the numerical controller acquires the program restart block data of blocks of which tool paths pass a boundary of this registered specified area, as well as the program restart block data of immediately preceding and succeeding blocks of this block. This program restart block data to be acquired will be described below.

Referring to FIG. 16, block data of blocks N103, N104, N105, N115, N116, N117, N203, N204, N205, and N909 executed by N207, N208, and N209 is acquired as program restart block data. As is clear from FIG. 13, the cycle time can be shortened if the block N105 immediately after the block (N104) of which tool path passes the boundary of the registered specified area is set as the start block for resuming the program, and the block N115 immediately before the block (N116) of which tool path passes the boundary of the registered specified area is set as the end block of the resumed program, as compared to setting the block N104 of which tool path passes the boundary of the specified area as the start block for resuming the program and setting the block N116 of which tool path passes the boundary of the specified area as the end block of the resumed program.

Also as is clear from FIG. 13, a wider area can be set for the resumed machining if the block N117 immediately after the block (N116) of which tool path passes the boundary of the specified area is set as the end block of the resumed program, as compared to setting the block N104 of which tool path passes the boundary of the specified area as the start block for resuming the program and setting the block N116 of which tool path passes the boundary of the specified area as the end block of the resumed program, whereby the machining can be resumed more reliably to the machining target portion.

Start/End Block Setting Unit of the Program Restart Function

The start/end block setting unit of the program restart function will be described. By performing search in a program restart block list screen, a list of block data sets acquired by the program restart block data acquisition unit is displayed on this screen (see FIG. 15).

A list of program restart block data sets appears on the left side of the program restart block list screen and any given one of the program restart block data sets can be selected by moving a cursor over it. On the right side of the program restart block list screen is displayed a list of programs in the vicinity of the selected program restart block data set. The cursor can also be moved over a block in the vicinity as shown in FIG. 17.

A start block for resuming the program is set by moving the cursor over one of the program restart block data sets or programs in the vicinity displayed in lists on the program restart block list screen, and by pressing a set button for setting the selected one as the start block for resumed operation. An "S" mark lights up on each left side of the program restart block data that is set as the start block for resuming the program, and of the program in the vicinity of the selected program restart block data. For example, if N204 is set as the start block for resuming the program, an "S" mark appears on the program restart block list screen, as shown in FIG. 18.

Similarly, an end block for the resumed program is set by moving the cursor over one of the program restart block data sets or a program in the vicinity displayed in lists on the program restart block list screen, and by pressing a set button for setting the selected one as the end block for resumed operation. An "E" mark lights up on each left side of the program restart block data that is set as the end block for the resumed program, and of the program in the vicinity of the selected program restart block data. For example, if N908 is set as the end block for the resumed program, an "E" mark appears on the program restart block list screen, as shown in FIG. 19. This end block for the resumed program must be a block that comes later than the start block for resuming the program.

After completing this preparatory operation for resuming the program, an actual machining by the resumed program is executed so that the programs between the start block and the end block may be resumed.

Next, the overall program restart process including the operation for setting the start block and the end block of the program restart function described above will be explained with reference to FIG. 20.

First, it is determined whether or not a machining area has been specified by the specified area registration unit (D1). If no machining area has been specified (NO at decision D1), the process ends here. If a machining area has been specified (YES at decision D1), the system keeps monitoring whether or not a button has been pressed, and waits until the button is pressed (D2 and D3).

When the button is pressed (YES at decision D3), it is determined whether or not the pressed button is one that instructs execution of a resumed program (D4). If it is not a program restart execution button (NO at decision D4), a preparatory process for resuming the program shown in FIG. 21 (to be described later) is performed, after which the process goes back to step D2. If it is a program restart execution button (YES at decision D4), it is determined whether or not all the setting necessary for actual machining by the resumed program has been completed (D5).

Figure 22:
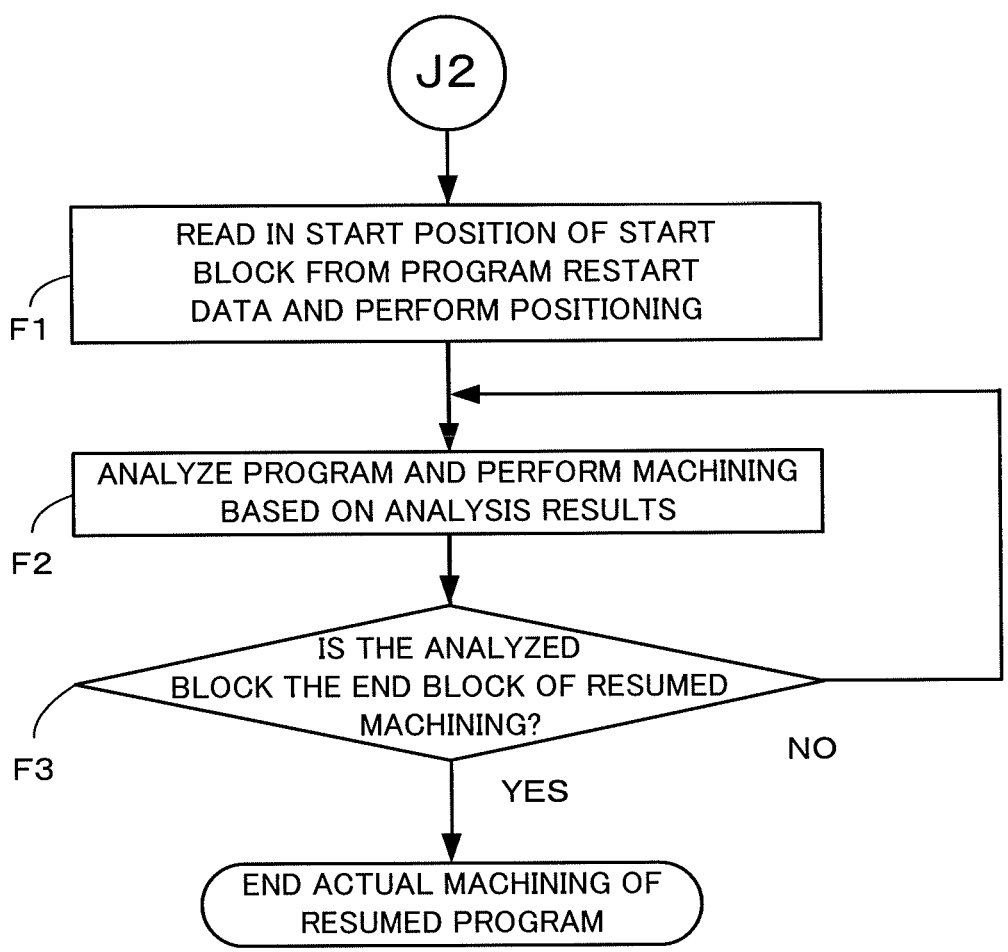
FIG. 22 is a flowchart showing the flow of an actual machining process by the resumed program.

If the setting necessary for actual machining by the resumed program has been completed (YES at decision D5), the actual machining by the resumed program shown in FIG. 22 (to be described later) is performed, after which the process ends. If the setting necessary for actual machining by the resumed program has not been completed (NO at decision D5), the process returns to step D2.

Figure 20:
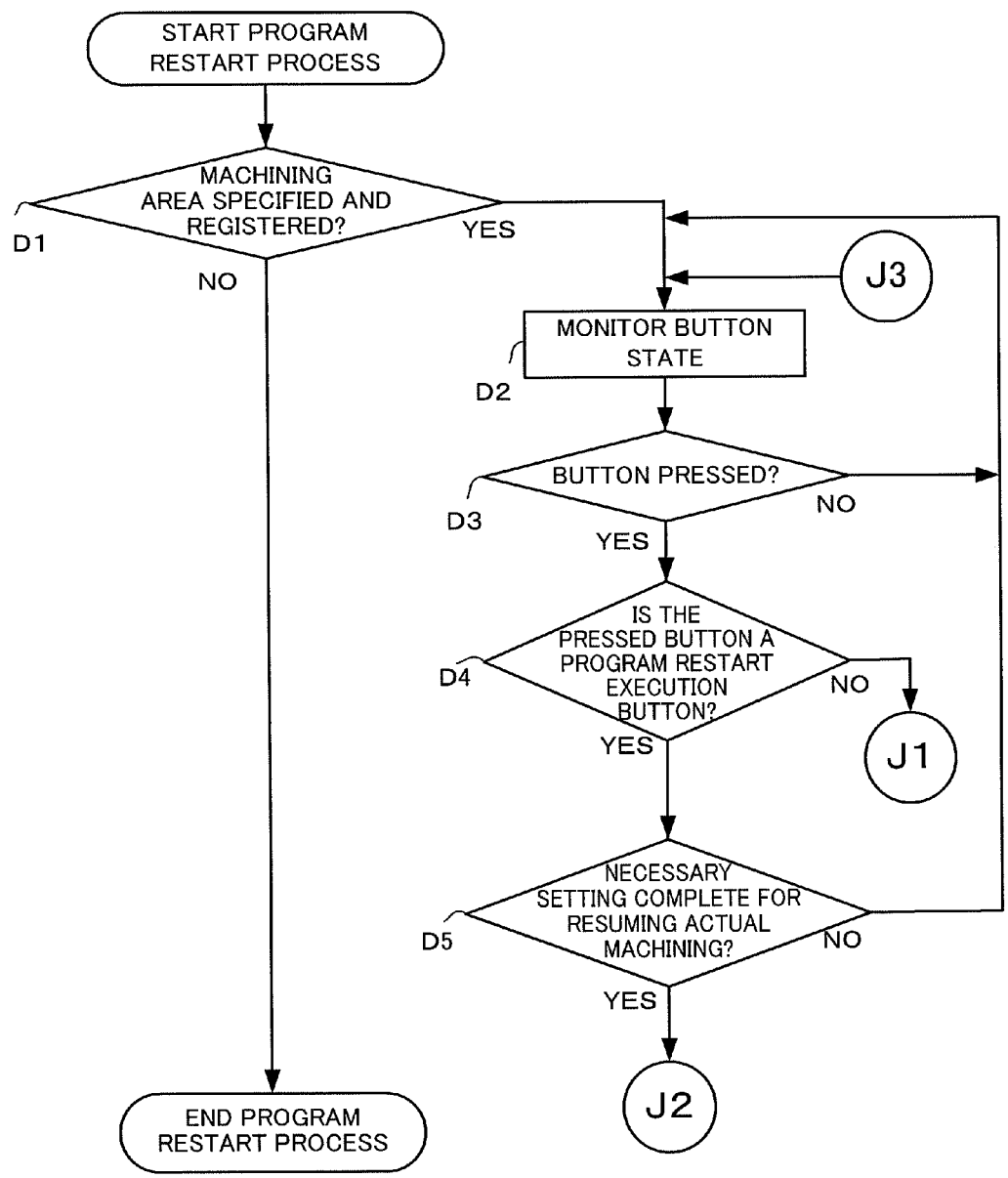
FIG. 20 is a flowchart showing the overall flow of a program restart process.
Figure 21:
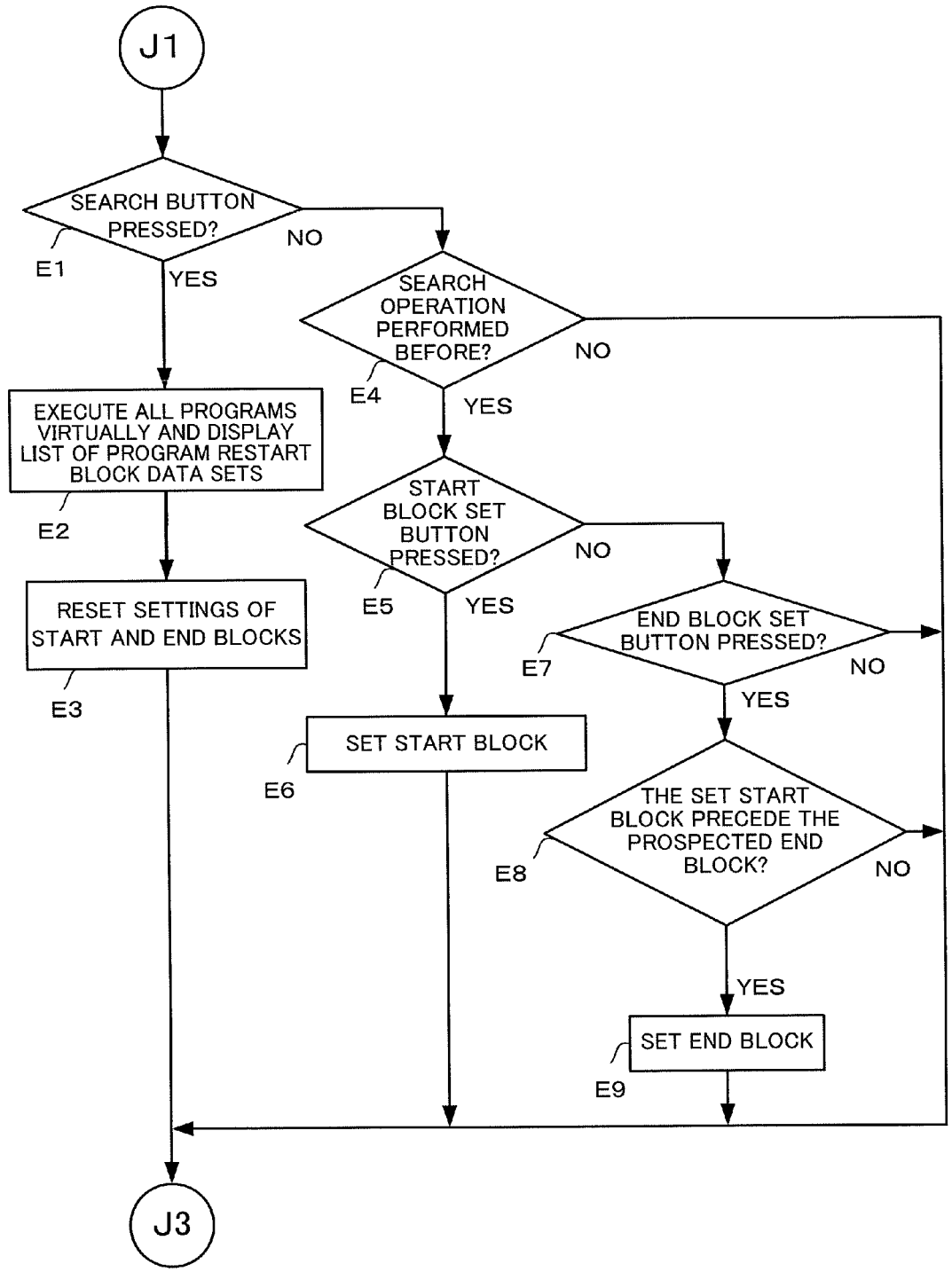
FIG. 21 is a flowchart showing the flow of a preparatory process for resuming a program.

The preparatory process for resuming a program shown in FIG. 21, which is performed in accordance with a decision result at the decision step D4 of the program restart process of FIG. 20, will be described in more detail.

First, it is determined whether or not a search button has been pressed (E1). If the search button has been pressed (YES at decision E1), the whole of the program is "virtually executed", and the list of acquired program restart block data sets is displayed in accordance with the settings of the specified area (E2). After that, the settings of the start block and the end block for the resumed program are both reset (E3). These steps E2 and E3 are referred to as "search operation".

If the search button has not been pressed (NO at decision E1), it is determined further whether or not the search operation (E2 and E3) has been performed at least once (E4). If no search operation has been performed (NO at decision E4), then this preparatory process for resuming the program ends here (namely, the process goes to step D2 shown in FIG. 20). On the other hand, if the search operation has been performed before (YES at decision E4), it is determined whether or not a start block setting button for resuming the program has been pressed (E5).

If the start block setting button for resuming the program has been pressed (YES at decision E5), a start block for resuming the program is set (E6), and this preparatory process for resuming the program ends here. On the other hand, if the start block setting button for resuming the program has not been pressed (NO at decision E5), it is determined whether or not an end block setting button for the resumed program has been pressed (E7). If the end block setting button for the resumed program has not been pressed (NO at decision E7), this preparatory process for resuming the program ends here.

If the end block setting button for the resumed program has been pressed (YES at decision E7), it is determined next whether or not a block that precedes the block to be set as the end block of the resumed program has already been set as the start block for resuming the program (E8). If no such block has been set as the start block for resuming the program yet (NO at decision E8), this preparatory process for resuming the program ends here. If a block as such has already been set as the start block for resuming the program (YES at decision E8), the end block for the resumed program is set, and the preparatory process for resuming the program ends.

"Virtually executing" the program at step E2 means that modal information (or functional information), status of auxiliary functions, and/or coordinates are updated without actually moving the tool, based on the analysis results of the program.

An actual machining by the resumed program, which is performed in accordance with a decision result at the decision step D5 of the program restart process of FIG. 20, will be described in more detail with reference to FIG. 22.

First, the start position of the block set as the start block for resuming the program is read in from the program restart block data, and positioning is performed (F1). The program is analyzed and actual machining is performed in accordance with the analysis results (F2). It is then determined whether or not the analyzed block is the end block of the resumed program (F3). If the analyzed block is not the end block of the resumed program (NO at decision F3), the process returns to step F2, where the program is analyzed and actual machining is performed based on the analysis. If the analyzed block is the end block of the resumed program (YES at decision F3), the actual machining by the resumed program is ended.

Figure 23:
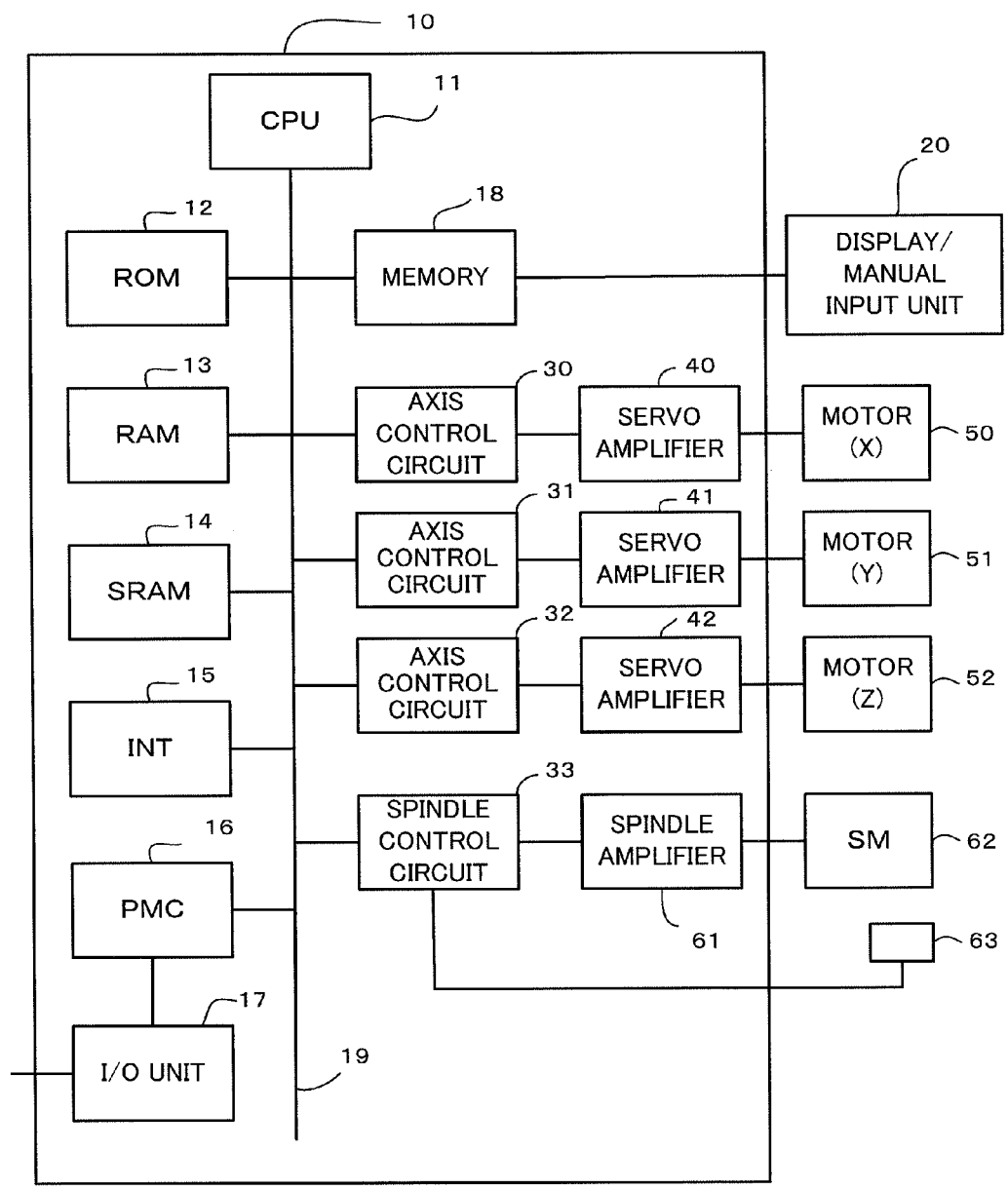
FIG. 23 is a block diagram illustrating a numerical controller having a program restart function.

Essential parts of the numerical controller 10 according to one embodiment of the present invention will be described with reference to the block diagram of FIG. 23.

A CPU 11 generally controls the numerical controller 10, i.e., the processor reads out system programs stored in a ROM 12 via a bus 19 and controls the numerical controller 10 overall. A RAM 13 stores temporary calculation data, display data, or various data entries input by an operator via a monitor/manual input unit 20. This monitor/manual input unit 20 is configured by a display device formed of a CRT or liquid crystal and manual input means such as a keyboard.

An SRAM 14 is configured as a non-volatile memory and powered by a backup battery (not shown) so that it can retain stored data even when the power of the numerical controller 10 is turned off. This SRAM 14 stores a decision table that specifies program restart block data acquisition codes pre-registered as non-cutting commands for acquisition of the program restart block data, rapid traverse commands, auxiliary function commands, commands for moving a pre-registered controlled axis, tool position correction commands, dwell commands, spindle stop commands, spindle rotation commands, and subprogram call commands, for allowing later determination of whether or not a block of a machining program contains a non-cutting command.

In the SRAM 14 are stored machining programs read in via an interface 15 or machining programs input via the monitor/manual input unit 20. The ROM 12 has the program already stored therein for acquiring program restart block data for realizing the program restart function according to the present invention.

The interface 15 establishes connection between the numerical controller 10 and external devices. A programmable machine controller (PMC) 16 outputs signals via an I/O unit 17 to auxiliary devices of the machine tool being controlled (such as an actuator of a robot hand for changing tools) and controls them in accordance with a sequence program installed in the numerical controller 10. The PMC receives signals from various switches on an operation panel equipped in the main body of the machine tool that is controlled by the numerical controller 10 and transmits the signals to the CPU 11 after performing necessary signal processing.

Axis control circuits 30 to 32 of respective feed axes (controlled axes) receive commands that instruct moving amounts of the respective feed axes from the CPU 11, and output feed commands to servo amplifiers 40 to 42. The servo amplifiers 40 to 42 drive servo motors 50 to 52 of the respective feed axes of the machine tool (control target). The servo motors 50 to 52 each include a position/speed sensor for feedback control of the position and speed using feedbacks from the position/speed sensors. The position/speed feedback control is not illustrated in FIG. 23. A spindle control circuit 33 outputs a spindle speed signal to a spindle amplifier 61 in accordance with a spindle rotation command. The spindle amplifier 61 rotates the spindle motor 62 at the instructed rotation speed based on the spindle speed signal, thereby driving the spindle. A position sensor 63 sends feedback pulses to the spindle control circuit 33 in synchronism with the rotation of the spindle motor 62.

What is claimed is:

1. A numerical controller that controls a machine tool having a plurality of controlled axes by analyzing and executing blocks of a machining program to machine a workpiece, and has a program restart function in which program restart block data is acquired for resuming and ending suspended machining of the workpiece and partial machining of the workpiece is performed based on the acquired program restart block data, the numerical controller comprising:

a specified area registration unit that specifies a machining area of each of the controlled axes and registering the specified machining area;

a specified area passing block determination unit that analyzes a block of the machining program and determines whether or not a moving path of a tool as commanded by the block, obtained by analyzing the block, has an intersection with a boundary of the machining area registered in the specified area registration unit; and a program restart block data acquisition unit that acquires the program restart block data of a currently analyzed block of the machining program if determined by the specified area passing block determination unit that the moving path of a tool as commanded by the block has an intersection with a boundary of the machining area registered in the specified area registration unit, wherein the specified area passing block determination unit determines whether or not a sequence of the distal end points of the tool, which is obtained by correcting the moving path of the tool to the positions of the tool distal end points, passes the boundary of the machining area, and wherein the program restart block data acquisition unit acquires, in addition to the program restart block data of a block of the machining program, the program restart block data of immediately preceding and succeeding blocks of the block, if determined by the specified area passing block determination unit that the moving path of a tool as commanded by the block passes a boundary of the registered machining area.

2. The numerical controller having a program restart function according to claim 1, further comprising:

a list display unit displaying a list of a plurality of program restart block data sets acquired by the program restart block data acquisition unit;

a program restart block data selecting unit selecting one of the program restart block data sets displayed in a list;

a machining program display unit displaying a machining program neighboring the selected program restart block data set; and a setting unit setting the selected program restart block data set or a block of the neighboring machining program as a start block and an end block of a program resumed by the program restart function.

3. The numerical controller having a program restart function according to claim 1, wherein the program restart block data is data required for resuming the program, and includes at least one of a block number of a currently executed machining program, start and end positions of the currently executed block, various pieces of modal information of a currently executed block, a number of a main program and a subprogram call block position, and a total number of blocks from the main program to the currently executed block.

4. A numerical controller that controls a machine tool having a plurality of controlled axes by analyzing and executing blocks of a machining program to machine a workpiece, and has a program restart function in which program restart block data is acquired for resuming and ending suspended machining of the workpiece and partial machining of the workpiece is performed based on the acquired program restart block data, the numerical controller comprising:

a specified area registration that specifies a machining area of each of the controlled axes and registering the specified machining area;

a determination unit that determines whether or not a currently analyzed block of the machining program is a non-cutting block based on pre-registered data allowing determination of whether the currently analyzed block is a non-cutting block;

a non-cutting block in-or-out determination unit that determines, if the currently analyzed block of the machining program is a non-cutting block involving a motion, whether or not a moving path of a tool as commanded by this block is inside the machining area registered in the specified area registration unit, and that determines, on the other hand, if the currently analyzed block of the machining program is a non-cutting block not involving a motion, whether or not a tool position during execution of that non-cutting block is located inside the machining area registered in the specified area registration unit; and a program restart block data acquisition unit that acquires the program restart block data of the non-cutting block in which a tool path or tool position has been determined to be located inside the machining area by the non-cutting block in-or-out determination unit and extracted and, wherein the program restart block data acquisition unit acquires, in addition to the program restart block data of a block of the machining program, the program restart block data of immediately preceding and succeeding blocks of the block, if determined by the non-cutting block in-or-out determination unit that the moving path of a tool as commanded by the block passes a boundary of the registered machining area.

5. The numerical controller having a program restart function according to claim 4, wherein the non-cutting block includes at least one of a program restart block data acquisition code pre-registered as a non-cutting command for acquisition of the program restart block data, a rapid traverse command, an auxiliary function command, a command for moving a pre-registered controlled axis, a tool position correction command, a dwell command, a spindle stop command, a spindle rotation command, and a subprogram call command.

6. The numerical controller having a program restart function according to claim 4, wherein the non-cutting block in-or-out determination unit determines whether or not a sequence of the distal end points of the tool, which is obtained by correcting the moving path of the tool to the positions of the distal end points of the tool, passes the boundary of the machining area, or determines whether a position of a distal end point of the tool, which is obtained by correcting the tool position to the position of the distal end point of the tool, is located inside the machining area.

7. The numerical controller having a program restart function according to claim 4, further comprising:
 a list display unit displaying a list of a plurality of program restart block data sets acquired by the program restart block data acquisition unit;
 a program restart block data selecting unit selecting one of the program restart block data sets displayed in a list;
 a machining program display unit displaying a machining program neighboring the selected program restart block data set; and
 a setting unit setting the selected program restart block data set or a block of the neighboring machining program as a start block and an end block of a program resumed by the program restart function.

8. The numerical controller having a program restart function according to claim 4, wherein the program restart block data is data required for resuming the program, and includes at least one of a block number of a currently executed machining program, start and end positions of the currently executed block, various pieces of modal information of a currently executed block, a number of a main program and a subprogram call block position, and a total number of blocks from the main program to the currently executed block.

9. A numerical controller that controls a machine tool having a plurality of controlled axes by analyzing and executing blocks of a machining program to machine a workpiece, and has a program restart function in which program restart block data is acquired for resuming and ending suspended machining of the workpiece and partial machining of the workpiece is performed based on the acquired program restart block data, the numerical controller comprising:
 a specified area registration that specifies a machining area of each of the controlled axes and registering the specified machining area;
 a determination unit that determines whether or not a currently analyzed block of the machining program is a non-cutting block based on pre-registered data allowing determination of whether the currently analyzed block is a non-cutting block;
 a non-cutting block out-or-in determination unit that determines, if the currently analyzed block of the machining program is a non-cutting block involving a motion, whether or not a moving path of a tool as commanded by this block is outside the machining area registered in the specified area registration unit, and that determines, on the other hand, if the currently analyzed block of the machining program is a non-cutting block not involving a motion, whether or not a tool position during execution of that non-cutting block is located outside the machining area registered in the specified area registration unit; and
 a program restart block data acquisition unit that acquires the program restart block data of the non-cutting block in which a tool path or tool position has been determined to be located outside the machining area by the non-cutting block out-or-in determination unit and extracted and, wherein the program restart block data acquisition unit acquires, in addition to the program restart block data of a block of the machining program, the program restart block data of immediately preceding and succeeding blocks of the block, if determined by the non-cutting block out-or-in determination unit that the moving path of a tool as commanded by the block passes a boundary of the registered machining area.

10. The numerical controller having a program restart function according to claim 9, wherein the non-cutting block includes at least one of a program restart block data acquisition code pre-registered as a non-cutting command for acquisition of the program restart block data, a rapid traverse command, an auxiliary function command, a command for moving a pre-registered controlled axis, a tool position correction command, a dwell command, a spindle stop command, a spindle rotation command, and a subprogram call command.

11. The numerical controller having a program restart function according to claim 9, wherein the non-cutting block out-or-in determination unit determines whether or not a sequence of the distal end points of the tool, which is obtained by correcting the moving path of the tool to the positions of the distal end points of the tool, passes the boundary of the machining area, or determines whether a position of a distal end point of the tool, which is obtained by correcting the tool position to the position of the distal end point of the tool, is located outside the machining area.

12. The numerical controller having a program restart function according to claim 9, further comprising:
 a list display unit displaying a list of a plurality of program restart block data sets acquired by the program restart block data acquisition unit;
 a program restart block data selecting unit selecting one of the program restart block data sets displayed in a list;
 a machining program display unit displaying a machining program neighboring the selected program restart block data set; and a setting unit setting the selected program restart block data set or a block of the neighboring machining program as a start block and an end block of a program resumed by the program restart function.

13. The numerical controller having a program restart function according to claim 9, wherein the program restart block data is data required for resuming the program, and includes at least one of a block number of a currently executed machining program, start and end positions of the currently executed block, various pieces of modal information of a currently executed block, a number of a main program and a subprogram call block position, and a total number of blocks from the main program to the currently executed block.

* * * * *